US 7,005,621 B2

(12) United States Patent
Hechler, IV

(10) Patent No.: US 7,005,621 B2
(45) Date of Patent: Feb. 28, 2006

(54) APPARATUS FOR COOKING BACON AND THE LIKE

(75) Inventor: Valentine Hechler, IV, 26 Meadowview Dr., Northfield, IL (US) 60093

(73) Assignee: Valentine Hechler, IV, Northfield, IL (US)

( * ) Notice: Subject to any disclaimer, the term of this patent is extended or adjusted under 35 U.S.C. 154(b) by 0 days.

(21) Appl. No.: 10/822,690

(22) Filed: Apr. 13, 2004

(65) Prior Publication Data

US 2004/0195236 A1 Oct. 7, 2004

Related U.S. Application Data

(63) Continuation-in-part of application No. 10/405,361, filed on Apr. 3, 2003, now abandoned.

(51) Int. Cl.
*H05B 6/80* (2006.01)

(52) U.S. Cl. ............ 219/732; 219/733; 219/735; 219/762; 426/118; 426/243; 99/DIG. 14; 99/425; 99/444

(58) Field of Classification Search ........ 219/725–735, 219/762; 99/DIG. 14, 425, 444, 446, 448, 99/449; 426/243, 241, 107, 118, 234
See application file for complete search history.

(56) References Cited

U.S. PATENT DOCUMENTS

| 2,565,269 | A | * | 8/1951 | Saxton .................. 220/324 |
| 4,112,833 | A | * | 9/1978 | Oda et al. ............... 99/425 |
| 4,214,515 | A | * | 7/1980 | Kubiatowicz ............ 99/400 |
| 4,398,077 | A | * | 8/1983 | Freedman et al. ........ 219/729 |
| 4,495,392 | A | * | 1/1985 | Derby ................... 219/729 |
| 5,310,981 | A | * | 5/1994 | Sarnoff et al. .......... 219/731 |
| 5,552,585 | A | * | 9/1996 | Fleck et al. ............ 219/732 |
| 5,714,740 | A | * | 2/1998 | Kelly et al. ............ 219/732 |
| 6,211,502 | B1 | * | 4/2001 | Hechler, IV ............ 219/732 |

* cited by examiner

*Primary Examiner*—Philip H. Leung
(74) *Attorney, Agent, or Firm*—Nixon Peabody LLP; Donald R. Studebaker

(57) ABSTRACT

A bacon cooker and method for microwave cooking of bacon. The bacon cooker includes an outer container, an inner container, a rack, and a lid. The lid is releasably attached to the container via a plurality of cam locks that which engage the container and rim and force the rim into the engagement with the underside of the lid. Lever arms with clasps specifically dimensioned to securely engage the outside wall of the lid when the cam locks in are the locked position. The rack is dimensioned to fit inside the container and consists of a plurality of radially extending vanes over which bacon is hung for cooking. The rack includes a upwardly extending stem with alternate vanes dimensioned to fit within a centrally located bore on the lid for securing the container to the lid. A microwave reflective surface is positioned between vacuum sealed outer and inner containers.

40 Claims, 4 Drawing Sheets

APPARATUS FOR COOKING BACON AND THE LIKE

CROSS REFERENCE TO RELATED APPLICATIONS

This is a continuation-in-part application of U.S. Ser. No. 10/405,361, filed Apr. 3, 2003 now abandoned.

BACKGROUND OF THE INVENTION

1. Field of the Invention

The present invention relates to a method and apparatus for cooking bacon or the like in a microwave oven.

2. Description of the Related Art

Uncooked strips of bacon can be prepared for eating by frying bacon in a skillet or by cooking the bacon in a microwave oven. Microwave cooking is often preferred due to the shorter time necessary to cook the bacon. Various microwave bacon cooker devices are known for holding the bacon during cooking, including those shown by U.S. Pat. Nos. D318,206; D366,807; 4,075,102; 4,112,883; 4,214,515; 4,343,978; 4,924,049; 4,933,528 and 6,211,502.

A plethora of concerns and problems arise when cooking bacon in a microwave oven. The grease produced during cooking is both messy and hot, and must be retained for disposal. Bacon that is allowed to cook on a horizontal surface will often become soaked with grease, rendering the food unpalatable. In the case of a cooking device that holds the bacon, it is desirable that the device be easy to manufacture and ease to use, while at the same time allowing for aesthetically pleasing, properly cooked, and good tasting bacon. Also, the issue of cleanup is a major concern. Ideally, because of the possibility of splattering grease generated during the cooking of the bacon, it would be beneficial to cook the bacon in a closed container.

While U.S. Pat. No. 6,211,502 to Hechler provides a bacon cooker that adequately solves many of the problems associated with the prior art, it is still subject to several disadvantageous limitations relating to the products performance, safety, and ease of use.

SUMMARY OF THE INVENTION

A primary object of the present invention is to provide a novel and improved apparatus for cooking bacon or other similar food strips in a microwave oven while minimizing the problems associated with conventional apparatus and methods for cooking bacon.

A further object of the present invention is to provide a novel and improved apparatus for cooking bacon or the like in a microwave oven while preventing the mess associated with conventional apparatus and methods for cooking bacon.

Another object of the present invention is to provide a novel and improved apparatus for cooking bacon or the like in a microwave oven while decreasing the risk of injury associated with conventional apparatus and methods for cooking bacon.

It is a further object of the present invention to provide a novel and improved bacon cooker having a cover unit for closing the open end of a microwave permeable container. The container is provided with an annular rim at the open end, and the cover includes improved cam locks that engage and force the rim against the cover.

Yet another object of the present invention is to provide a novel and improved bacon cooker having a cover for engaging and closing the open end of a container. The cover is provided with a steam vent formed by an elongate, open ended shaft which defines a vent passage of constricted cross section to prevent liquid fat from exiting through the steam vent.

Another object of the present invention is to provide a novel and improved bacon cooker having a cover for engaging and closing the open end of a container.

A still further object of the present invention is to provide a novel and improved bacon cooker having a cover unit, a microwave permeable container, and a rack for holding bacon. The rack includes radially spaced outward extending vanes over which bacon is hung for cooking and is dimensioned to fit inside the microwave permeable container. The rack further includes an upwardly extending shaft with radially extending projections fitted to engage and secure the cover unit.

Yet a further object of the invention is to provide a novel and improved bacon cooker having a cover unit including an improved handle for safe and easy handling and compact storage of the cover unit.

A further object of the present invention is to provide a novel and improved bacon cooker including an inner and outer container with a thin microwave reflecting surface, e.g. aluminum foil, positioned therebetween.

Yet a further object of the present invention is to provide a novel and improved bacon cooker that is capable of preparing uniformly cooked and palatable bacon.

These and other objects of the present invention are achieved by providing a microwave permeable lid, a microwave permeable container, and a microwave permeable rack dimensioned to fit inside the container. The container has an open end with an annularly extending, laterally projecting rim. The cover unit releasably attaches to the container by cam locks and includes a centrally-located bore with laterally extending protrusions from the inside portion of the cover unit defining the bore. A plurality of radially vanes are affixed to the rack. The vanes contain an upwardly extending portion dimensioned to fit within the centrally located bore in the lid. In a preferred embodiment, the apparatus includes an inner and an outer container with a thin reflective surface positioned therebetween.

DETAILED DESCRIPTION OF THE PREFERRED EMBODIMENTS

Figure 1:
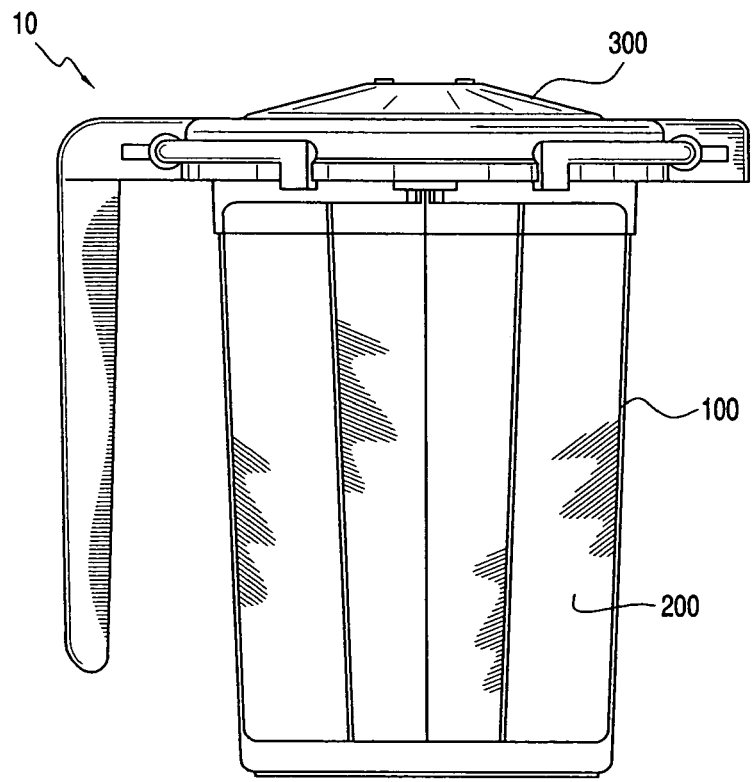
FIG. 1 is a side view of the assembled bacon cooker 10 of the present invention.
Figure 2:
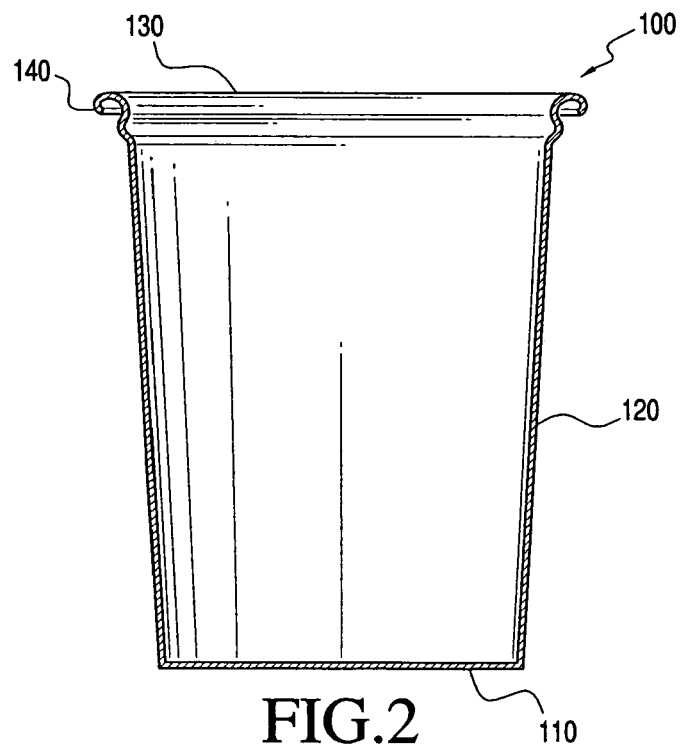
FIG. 2 the side view of the container 100.

Referring now to FIG. 1, the bacon cooker indicated generally at 10 consists of a container 100 (illustrated as being transparent), a rack 200, and a lid 300 formed to cooperate with a rimmed, disposable microwavable permeable container. As shown in FIG. 2, container 100 has a bottom wall 110 and a sidewall 120 terminating at an open end 130 defined by an annular, laterally projecting rim 140 of the type found on many conventional containers. Ideally, container 100, rack 200 and lid 300 are made of low cost plastic which retains stiffness and strength at elevated temperatures involved in microwaving bacon is capable of retaining hot grease.

Figure 3A:
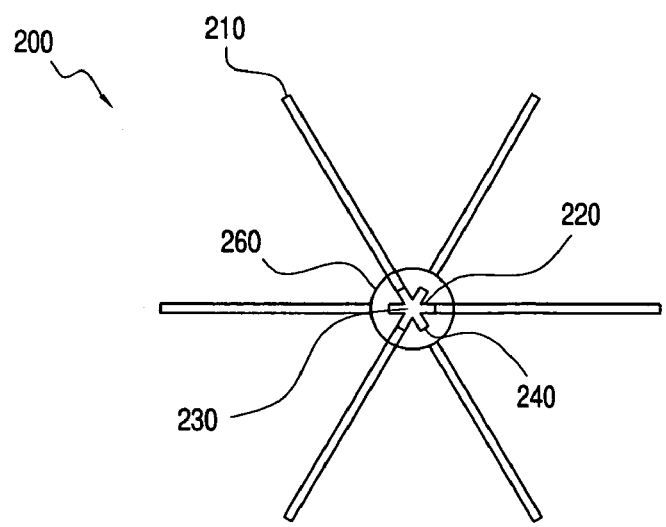
FIGS. 3A and 3B is a plan view and a side view, respectively, of the rack 200.
Figure 3B:
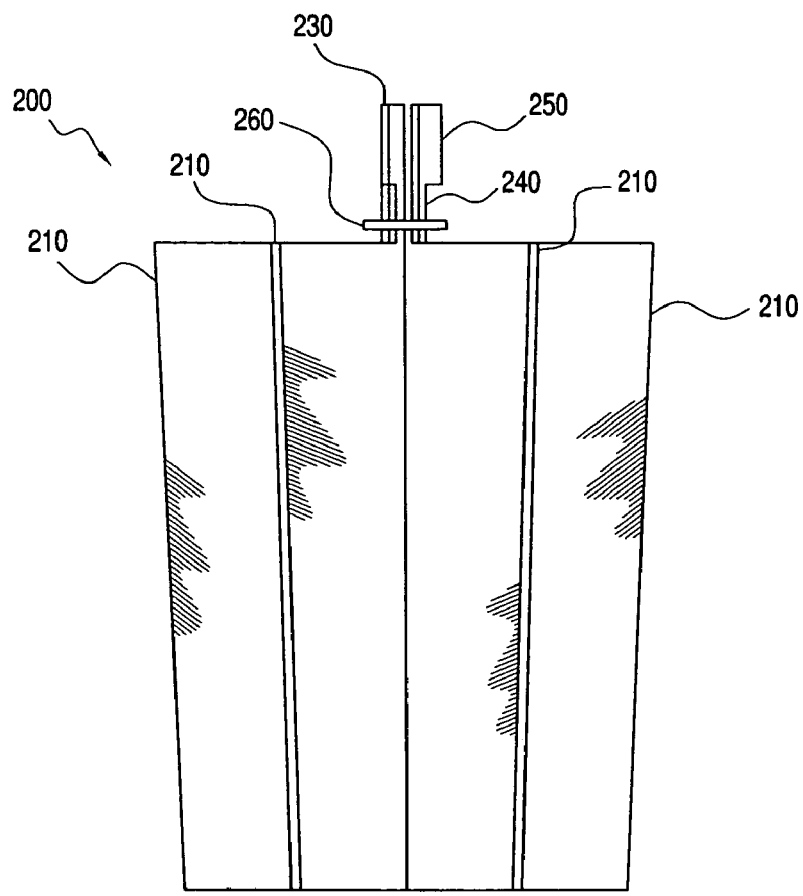

As shown in FIGS. 3A–3B, rack 200 consists of a plurality, preferably six, radially extending vanes 210 over which bacon is hung for cooking. Vanes 210 are joined at a common center 220 and are dimensioned to fit within container 100. A bayonet-like stem 230, formed from upwardly extending vane projections 240, extends upwardly from center 220 of the rack 200. At least one, but preferably three of vane projections 240 have laterally extending tabs 250, such that the upper portion of the at least one vane projections 240 is wider than the lower portion thereof. A support disc 260 is positioned under tabs 250 on the lower portion of stem 230 to maintain proper spacing between rack 200 and lid 300 when the bacon cooker 10 is assembled.

Figures 4A, 4B, 4C:
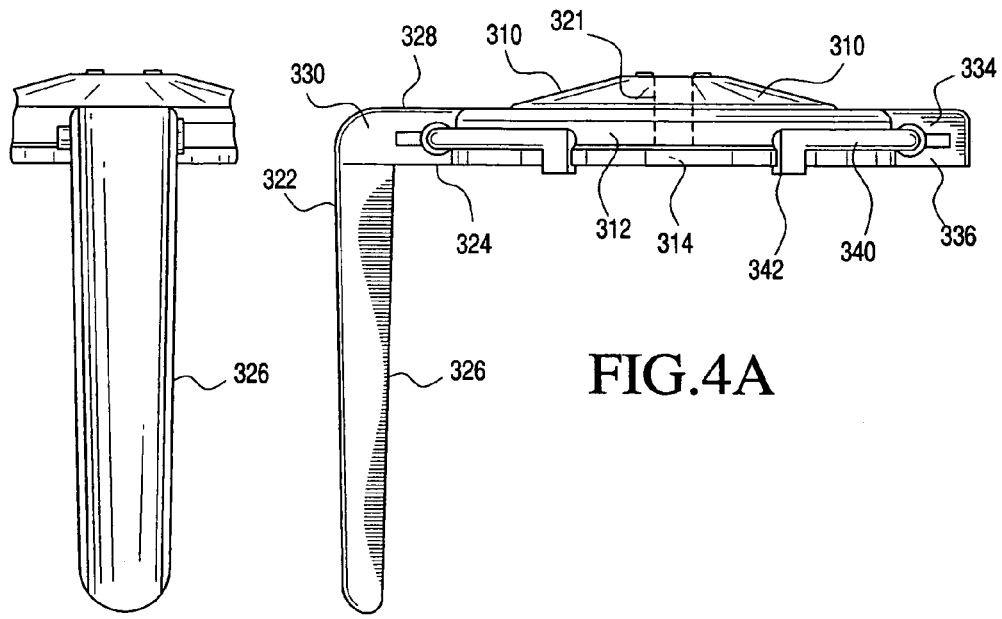
FIGS. 4A–4E is a side of the lid 300, a plan view of the lid 300, and a side view of the lid handle 322, a side view of the alignment tabs 323, and a partial cross-section of the clasp 342 engaging the peripheral rim 314, respectively.
Figures 4D, 4E:
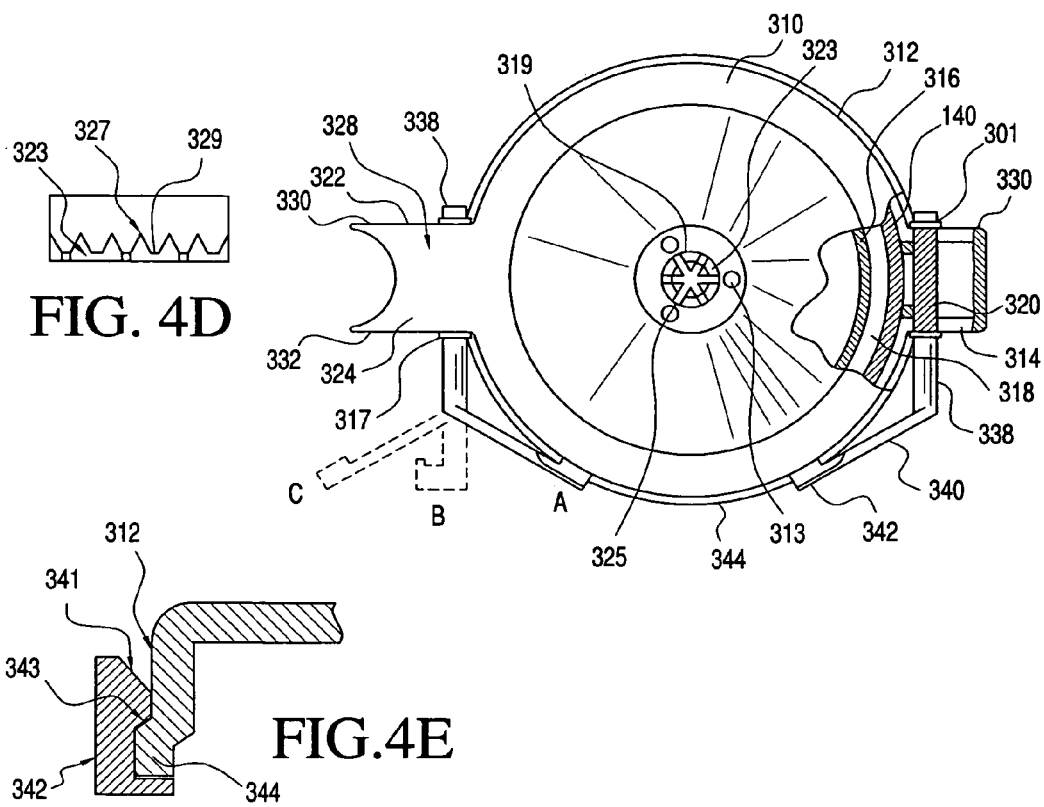

Referring now to FIG. 4A–4E, lid 300 has a top wall 310 connected to an outer sidewall 312 having a peripheral rim 314. Extending downward from the underside of top wall 310 is an inner side wall 316, so as to form a container rim receiving compartment 318 extending annularly around top wall 310. Rim 140 of a container 100 is inserted into rim receiving compartment 318 until it engages the underside of top wall 310. Rim receiving compartment 318 can be made large enough to receive containers having open ends of different diameters. Top wall 310 is provided with a central bore 319 of sufficient diameter to receive and engage stem 230. A bore wall 321 (shown by dashed lines in FIG. 4A) extends downwardly from the underside of top wall 310 to define central bore 319. Extending laterally from the bottommost portion of bore wall 321 into central bore 319 are a alignment tabs 323 spaced so as to define at least one, but preferably three slots 325 dimensioned to receive laterally extending tabs 250 on stem 230 of rack 200. The top surface of alignment tabs 323 include a plurality of teeth 327, preferably two, the inside edges of which are sloped downwards so as to form groove 329, as shown in FIG. 4D. Rack 200 can be secured to lid 300 in a bayonet-like fashion prior to inserting rack 200 into container 100 by fully inserting tabs 250 into slots 325 and rotating the lid such that the bottom of tabs 250 are aligned with grooves 329 in alignment tabs 323. The downwardly sloping edges of teeth 327 are operative to direct tabs 250 into slots 325 in the event that tabs 250 are not perfectly aligned with grooves 329. Slots 325 are of sufficient size to vent steam from the bacon cooker 10 during microwave cooking while preventing significant passage of grease from the container. The top wall 310 of lid 300 preferably includes a plurality of raised dots 313 vertically aligned with grooves 329, to facilitate the tactile location of grooves 329 and assist site impaired persons, for example, in properly positioning lid 200 onto container 100.

It is important for the container 100 to be firmly attached to the lid 300 during the microwave cooking process. If, for example, the cover unit should become detached, the hot contents of the bacon cooker will forcetbily splatter out of open end 130. To removably secure a container in place, lid 300 is provided with two or more cam locks which engage the underside of container rm 140 when the cam locks lock in place, as shown in FIGS. 4A–4C. In a preferred embodiment a first vain lock 315 is mounted in handle 322. Handle 322 preferably consists of a neck 324 and a grasping arm 326. Neck 324 consists of a neck top wall 328 that is coextensive with lid top wall 310 and which joins downwardly extending neck sidewalls 330 and 332. Grasping arm 326 joins the distal end of neck top wall 328 relative to lid top wall 310 and extends downwardly from neck 324. Thus, when lid 300 is attached to container 100, container sidewall 120 and grasping and 326 are substantially parallel to one another. Neck 324 preferably extends a distance laterally from lid top wall 310 such that one's hands do not touch any portion of container 100 when handling grasping arm 326 of handle 322. The downward configuration of grasping and 326 allows for easy handling and storage of the bacon cooker 10.

A second cam lock 320 is mounted in a lock mount 330 which extends laterally from lid outer sidewall 312. This lock mount is positioned opposite to the handle 322 and includes a top wall 311 which is coextensive with lid top wall 310 and which joins downwardly extending, lock mount sidewalls 334 and 336.

The construction of cam locks 315 and 320 are identical. Each cam lock includes a pivot pin 338 mounted for pivotal movement. The pivot pin for first cam lock 315 extends between the handle sidewalls 330 and 332 and rotatably rests therein. The pivot pin 338 for the second cam lock 320 extends between lock mount sidewalls 334 and 336 and is also rotatably rests therein. For convenience, the functionality of only one cam lock is discussed in detail below. It should be recognized, however, that the discussion as it relates to one cam lack applies equally to other cam locks. The cam locks preferably consist of two laterally projecting arms 301 which, when in the locked position, engage the underside of container rim 140. When container 100 is exposed to microwaves, the elasticity of the upper portion of side wall 120 of container 100 may increase. Thus, to ensure that arms 301 remain securely engaged to the underside of container rim 140, aims 301 are preferably of such length to firmly force the upper portion of side wall 120 against inner side wall 316 of lid 300. The spacing of lid outer sidewall 312, lid inner sidewall 316, and container sidewall 120 permits the elliptical distortion of container sidewall 120 when arms 301 are moved into the locking position, and provides instant, non-friction release of lid 300 from container 100 when the cam locks are unlocked.

An inwardly inclined actuator lever and 340 is connected to one end of the pivot pin 338 to rotate the pivot pin and to lock the cam lock. The lever arm 340 is angled to frictionally engage the lid outer sidewall 314 when the cam section 346 has been pivoted thereby into engagement wit the underside of container rim 140. In a preferred embodiment, a clasp 342 is positioned at the end of lever arm 340 and is dimensioned to snap over peripheral rim 344 on the outer sidewall 314 of lid 300 in order to secure lid 300 onto container 100, Clasp 342 can thus be engaged to secure lid 300 to the container 100 by simply pushing actuator lever and 340 to position A, as shown in FIG. 4B until clasp 342 snaps onto peripheral rim 344. To unlock the lid from the container, lever arm 340 is forced downwardly against the incline edge of outer sidewall to cause the pivot pin 338 to pivot cam section 346 downwardly to a vertical position where lever arm 340 will be positioned at B in FIG. 4B. Handle neck sidewalls 330 and 332 and lock mount sidewalls 334 and 336 each include a slot 339 through which pivot pin 338 can be removed when lever and 340 is in position C, shown in FIG. 4B. Slot 339 contains a circular-shaped portion dimensioned to receive pivot pin 338 and a rectangular portion dimensioned to allow the passage of the cam locks therethrough, when pivot pin 338 and cam lock 315 are positioned 180° degrees relative to position A. The end of pivot pin 338, located distally from clasp 342 is slightly larger in diameter than slot 339, such that a slight degree of force is required to insert and remove pivot pin 338. This prevents the unintentional detachment from lid 300. Pivot pin 338 also includes a stop ring 317 of a diameter larger than slot 339 and which is positioned circumferentially around pivot pin 338. Stop pin 317 abuts against neck 324 to maintain pivot pin 338 in proper position.

An inwardly inclined actuator lever arm 340 is connected to one end of the pivot pin 338 to rotate the pivot pin and to lock the cam lock. The lever arm 340 is angled to frictionally engage the lid outer sidewall 314 when the cam section 346 has been pivoted thereby into engagement with the underside of container rim 140. In a preferred embodiment, a clasp 342 is positioned at the end of lever arm 340 and is dimensioned to snap over peripheral rim 344 on the outer sidewall 314 of lid 300 in order to secure lid 300 onto container 100. Clasp 342 can thus be engaged to secure lid 300 to the container 100 by simply pushing actuator lever arm 340 to position A, as shown in FIG. 4B until clasp 342 snaps onto peripheral rim 344. To unlock the lid from the container, lever arm 340 is forced downwardly against the incline edge of outer sidewall to cause the pivot pin 338 to pivot cam section 346 downwardly to a vertical position where lever arm 340 will be positioned at B in FIG. 4B. Handle neck sidewalls 330 and 332 and lock mount sidewalls 334 and 336 each include a slot 339 through which pivot pin 338 can be removed when lever arm 340 is in position C, shown in FIG. 4B. Slot 339 contains a circular-shaped portion dimensioned to receive pivot pin 338 and a rectangular portion dimensioned to allow the passage of the cam locks therethrough, when pivot pin 338 and cam lock 320 are positioned 180° degrees relative to position A. The end of pivot pin 338, located distally from clasp 342 is slightly larger in diameter than slot 339, such that a slight degree of force is required to insert and remove pivot pin 338. This prevents the unintentional detachment from lid 300. Pivot pin 338 also includes a stop ring 317 of a diameter larger than slot 339 and which is positioned circumferentially around pivot pin 338. Stop pin 317 abuts against neck 324 to maintain pivot pin 338 in proper position.

By pushing downwards on lever arm 340, clasp 342 can be disengaged from peripheral rim 344. Thus, to lock and unlock lid 300 onto container 100, lever arm 340 is simply pushed upwards and downwards, respectively. As illustrated in FIG. 4E, a top portion of clasp 342 includes an inwardly sloping face 341 having an angle of approximately 45° relative to outer side wall 312 when clamped onto outer rim 344. When lever arm 340 is pushed upwardly into the locked position, inwardly sloping face 341 of clasp 342 rubs against rim 344 forcing clasp 344 outward such that clasp 342 can be positioned over rim 344 without having to pull laterally on lever arm 340. Clasp 342 also includes an outwardly sloping face 343 having an angle of approximately 30° relative to outer side wall 312, that engages the upper portion of rim 344 when lever arm 340 is in the locked position. The bottommost edge 345 of clasp 342 extends under rim 344. The arrangement of inwardly sloping face 341, outwardly sloping face 343, and bottom edge 345 of clasp 342 creates a recess on the inside edge of clasp 342 for receiving rim 344 and creating an interference fit. The interference fit is tight enough to prevent the inadvertent disengagement of clasp 342 from rim 344 under normal usage, but large enough to permit disengagement to quickly relieve internal pressure if the internal pressure within container 100 becomes extraordinarily high.

The apparatus of the present invention allows for the quick, clean, and safe microwave cooking of bacon and other food items. Bacon is hung over vanes 210 of rack 200. The number of bacon strips accommodated by rack 200 primarily depends on the width of vanes 210 and the number of bacon strips loaded onto vanes 210. Obviously, when using wider bacon strip, a lesser number of strips fit on any one vane. Once the bacon is loaded onto rack 200, lid 300 is placed onto rack 200 by inserting stem 230 of rack 200 through central opening 319 such that tabs 250 on vane projections 240 are aligned with and inserted into slots 325 defined by the alignment tabs 323 extending from bore wall 321 until the underside of alignment tabs 323 engages support disc 260. Lid 200 is then rotated to align vane projections 240 with grooves 329. Then lid 200, with rack 200 attached, is placed into container 100. Once lid 100 is properly in place, lever arms 340 are pushed upwards such that clasps 342 securely snap onto peripheral rim 314 on the outside wall 312 of lid 300. With lid 300 securely fastened to container 100, bacon cooker 10 is then placed into a microwave oven and the bacon is cooked for a predetermined length of time.

Only by using a closed, covered cooking unit that safely contains grease splatter can bacon be effectively cooked in a microwave without having bacon grease soil the surfaces of the microwave. However, when bacon is microwaved in an enclosed cooker without a ventilating means, steam generated during cooking becomes so pressurized that the cooker can explode, thereby spilling the hot contents of the cooker and potentially causing serious injury. All animal fats are composed of glyceryl esters of fatty acids, and as they cook, they release water in the form of steam via a process known as effervescence. As bacon cooks, the fat that drips from the bacon collects as liquid fat at the bottom on an enclosed cooker to form a liquid mixture. The steam that effervesces from the bacon could build up pressure that could forcefully blow up an enclosed cooker. Even ventilation of steam through central opening 319 of lid 300, does not completely ensure that lid 300 will remain attached to container 100 during the cooking of bacon. Although most of the steam that effervesces from the bacon will be vented through central opening 319, some will condense on the cooler sides of container 100 as droplets which run down into the hot grease collected at the bottom of the container. The water that collects below the liquid bacon fat, is superheated due to the weight of the liquid bacon fat above it. The water gets even hotter as the layer of liquid fat gets thicker. The application of continued microwaves heats this water and converts it back to steam. When the steam rises upwards from the bottom of container 100 it tends to erupt through the surface of the liquid bacon fat, and if forceful enough, can blow lid 300 off container 100.

As long as water is present, the temperature of the liquefied fat cannot exceed the boiling point of water, which at sea level is 212° F. As the cooking continues, a point is reached when the water generated by the effervescence becomes insufficient to replenish the water lost through boiling from the bottom of container 100. Absent freely available water, the temperature of the aforementioned mixture, consisting primarily of sloughed-off bacon particles, liquefied bacon fat, sloughed-off bacon particles, molecularly locked-up water, and higher level nitrogenous organic compounds which accumulates at the bottom of bacon cooker rises significantly. If cooking continues absent a sufficient amount of freely available water, the temperature of this mixture can exceed 300° F., which depending on the material of which container 100 is composed, could cause the bottom portion of the container 100 to melt and the mixture to spill. It is desirable, therefore, to reduce the rate by which water is lost through boiling, such that the water generated by the effervescence remains sufficient to replenish water at the bottom of the container. Unfortunately, the simple addition of a predetermined amount of water to the container to accommodate for the water loss from the container 100 collected through effervescence results in the microwaves being attracted to the added water, rather than the bacon. This disadvantageously prolongs the cooking time and reducing the available crispiness of the bacon.

Figure 5:
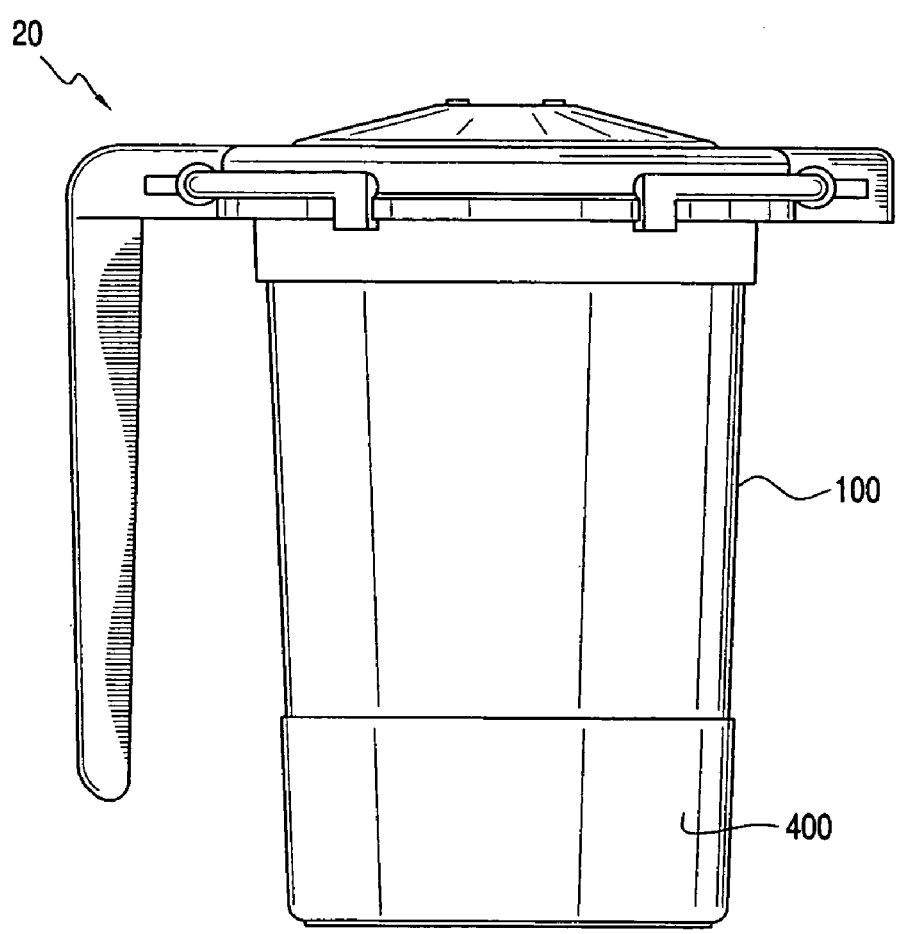
FIG. 5 is a side view of the bacon cooker 20 of the present invention.

To overcome these problems, the present invention provides, in another embodiment, a bacon cooker 20, as shown in FIG. 5. Bacon cooker 20 preferably contains the aforementioned components and features of bacon cooker 10 described above, and shown in FIG. 1–4, but in addition includes an outer cup 400 applied to the lower portion of container 100. Cup 400 is preferably composed of the same material as container 100, to facilitate the synchronous expansion and contraction of cup 400 and container 100. Cup 400 has a small air vent hole (not shown) on its bottom side. A thin microwave reflective surface, (e.g., preferably ordinary household aluminum foil having a dull side and a shiny side), is positioned between cup 400 and 100, with the shiny side abutting the outside surface of container 100. The reflective surface preferably covers only the bottom surface of container 100. Alternatively, however, the reflective surface may extend from the bottom of container wall 110 of container 100 upwards to cover a portion of container sidewall 120, so as to form a cup. The reflective surface, however, preferably only extends up sidewall 120 far enough such that the cup created is only deep enough to hold the maximum amount of water-free mixture generated by the cooking of the maximum number of bacon strips. In any event, the reflective surface should not extend so far up sidewall 120 such that the cooking uniformity of the bacon is compromised. Should the temperature of the liquid mixture for any reason rise high enough to melt the bottom of container 100, the cup formed from the reflective surface will capture the hot liquid mixture, protecting the user from serious burns.

In the microwave bacon cooking process, omni directional microwaves pass through container 100, and its components and contents. In the absence of a reflective layer, the microwaves continue unimpeded and exit container 100. However, where as in accordance with the present embodiment, a reflective layer is applied to the outside of container 100, microwaves impinge upon the shiny surface of the foil and are omni directionally reflected back through the interior of container 100. This process occurs continuously during the cooking process.

The embodiments of the invention shown and described herein are solely for exemplary purposes only and in no way limit the scope of the present invention.

What is claimed is:

1. A microwavable cooking apparatus for cooking bacon and the like, comprising:
    a container, said container having at least one container sidewall, an inner and outer surface, an open end, and a laterally projecting rim at the open end defining a rim undersurface;
    a lid; and
    a cooking rack, wherein said cooking rack comprises:
        mechanism for removeably suspending said cooking rack from said lid; and
        a plurality of radially extending vanes dimensioned to fit within said container.

2. The microwavable apparatus of claim 1, wherein said lid includes a bore defined by a bore wall.

3. The microwavable apparatus of claim 2, wherein a plurality of tabs extend laterally from said bore wall into said bore.

4. The microwavable cooking apparatus of claim 3, wherein said mechanism includes a stem positioned within said bore, said stem comprising a plurality of radially extending vanes, and wherein said cooking rack is suspended to said lid by the plurality of radially extending vanes of said stem being engaged with said tabs.

5. The microwavable cooking apparatus of claim 2, wherein said mechanism includes a stem dimensioned to fit within said bore.

6. The microwavable cooking apparatus of claim 1, wherein a portion of the top wall of said lid is substantially dome-shaped.

7. The microwavable cooking apparatus of claim 1, wherein a handle is connected to said lid.

8. The microwavable apparatus of claim 7, wherein a first portion of said handle projects laterally from said lid and a second portion of the handle projects downward from the distal end of said first portion of said handle.

9. The microwavable apparatus of claim 1, wherein a plurality of container locks are mounted on said lid for movement between a locked position and an unlocked position.

10. The microwavable cooking apparatus of claim 9, wherein said container locks each include a cam section which engages said rim undersurface and forces said the inner surface of said container against the lid when the container locks are in the locked position.

11. The microwavable cooking apparatus of claim 9, wherein said lid comprises a lock mount for each container lock, a cam opening formed in said lock mount, each said container lock being mounted for pivotal movement on said lock mount and including a cam section which extends through the cam opening in said lock mount outer wall, said cam section operating to engage the undersurfaces of said rim against said body in the locked position of the container lock.

12. The microwaveable apparatus of claim 11, wherein one end of said container lock is enlarged to deter involuntary removal of container lock from said lock mount, and wherein said enlarged end of container lock has a split end, said split end being compressible to facilitate voluntary removal of said container lock from said lock mount.

13. The microwavable cooking apparatus of claim 9, wherein each said container lock includes an operating lever connected to pivot said container lock between the locked and unlocked positions.

14. The microwavable cooking apparatus of claim 13, wherein said operating lever includes a clasp dimensioned to securely engage the outer sidewall of said lid, when said container lock is in the locked position.

15. The microwavable apparatus of claim 9, wherein at least one laterally projecting arm is coupled to at least one of said plurality of container locks, and wherein said at least one laterally projecting arm engages at least one of the container sidewall and the container rim when the lock is in the locked position.

16. The microwavable cooking apparatus of claim 1, wherein the plurality of radially extending vanes are spaced substantially equidistant from one another.

17. The microwavable apparatus of claim 1, wherein two container locks are mounted on said lid for movement between a locked position and an unlocked position, said container locks being positioned such that in the locked position the container sidewall has an elliptical distortion.

18. The microwavable apparatus of claim 1, wherein at least one of the inner surface and the outer surface of said container is at least partially covered with microwave reflecting surface.

19. The microwavable apparatus of claim 18, wherein said microwave reflecting surface is aluminum foil.

20. A microwavable cooking apparatus for cooking bacon and the like, comprising:
   an outer container, said outer container having at least one container sidewall, an inner and outer surface, and an open end;
   an inner container, said inner container having at least one container sidewall, an inner and outer surface, and an open end and a laterally projecting rim at the container open end defining a rim undersurface, wherein at least a portion of said inner container is dimensioned to fit within said outer container;
   a lid; and
   a cooking rack, wherein said cooking rack comprises:
      mechanism for removeably suspending said cooking rack from said lid; and
      a plurality of radially extending vanes dimensioned to fit within said inner container.

21. The microwavable cooking apparatus of claim 20, wherein said outer container covers a predefined portion of said inner container, and wherein a microwave reflecting surface is positioned between said outer container and said inner container.

22. The microwavable cooking apparatus of claim 21, wherein a vacuum seal is formed between said outer container and said inner container.

23. The microwavable apparatus of claim 20, wherein said lid includes a bore defined by a bore wall.

24. The microwavable apparatus of claim 23, a plurality of tabs extend laterally from said bore wall into said bore.

25. The microwavable cooking apparatus of claim 24, wherein said mechanism includes a stem positioned within said bore, said stem comprising a plurality of radially extending vanes, and wherein said cooking rack is suspended to said lid by a the plurality of radially extending vanes of said stem being engaged with said tabs.

26. The microwavable cooking apparatus of claim 23, wherein said mechanism includes a stem positioned to fit within said bore.

27. The microwavable cooking apparatus of claim 20, wherein at least a portion of the top surface of said lid is substantially dome-shaped.

28. The microwavable cooking apparatus of claim 20, wherein a handle is connected to said lid.

29. The microwavable apparatus of claim 28, wherein a first portion of said handle projects laterally from said lid and a second portion of the handle projects downward from the distal end of said first portion of said handle.

30. The microwavable apparatus of claim 20, wherein a plurality of container locks are mounted on said lid for movement between a locked position and an unlocked position.

31. The microwavable cooking apparatus of claim 30, wherein each said container lock includes an operating lever connected to pivot said container lock between the locked and unlocked positions.

32. The microwavable cooking apparatus of claim 31, wherein said operating lever includes a clasp dimensioned to securely engage the outer sidewall of said lid when said container lock is in the locked position.

33. The microwavable apparatus of claim 30, wherein at least one laterally projecting arm is coupled to at least one of said plurality of container locks, and wherein said at least one laterally projecting arm engages at least one of the container sidewall and the container rim when the lock is in the locked position.

34. The microwavable cooking apparatus of claim 20, wherein said container locks each include a cam section which engages said rim undersurface and forces said the inner surface of said container against the lid when the container locks are in the locked position.

35. The microwavable cooking apparatus of claim 20, wherein said lid comprises a lock mount for each container lock, a cam opening formed in said lock mount, each said container lock being mounted for pivotal movement on said lock mount and including a cam section which extends through the cam opening in said lock mount, said cam section operating to engage the undersurfaces of said rim against said body in the locked position of the container lock.

36. The microwaveable apparatus of claim 35, wherein one end of said container lock is enlarged to deter involuntary removal of container lock from said lock mount, and wherein said enlarged end of container lock has a split end, said split end being compressible to facilitate voluntary removal of said container lock from said lock mount.

37. The microwavable cooking apparatus of claim 20, wherein the plurality of radially extending vanes are spaced substantially equidistant from one another.

38. The microwavable apparatus of claim 20, wherein two container locks are mounted on said lid for movement between a locked position and an unlocked position, said container locks being positioned such that in the locked position the container sidewall has an elliptical distortion.

39. The microwavable apparatus of claim 20, wherein at least one of the inner surface of said inner container, the outer surface of said inner container, the inner surface of said outer container, and the outer surface of said outer container is at least partially covered with microwave reflecting surface.

40. The microwavable apparatus of claim 39, wherein said microwave reflecting surface is aluminum foil.

* * * * *